(12) United States Patent
Nakagawa

(10) Patent No.: US 7,547,254 B2
(45) Date of Patent: Jun. 16, 2009

(54) DRIVE SHAFT FOR ATVS

(75) Inventor: Tohru Nakagawa, Iwata (JP)

(73) Assignee: NTN Corporation, Osaka (JP)

( * ) Notice: Subject to any disclaimer, the term of this patent is extended or adjusted under 35 U.S.C. 154(b) by 223 days.

(21) Appl. No.: 11/115,414

(22) Filed: Apr. 27, 2005

(65) Prior Publication Data

US 2005/0261065 A1    Nov. 24, 2005

(30) Foreign Application Priority Data

May 24, 2004   (JP)   ............................. 2004-153796

(51) Int. Cl.
*F16D 3/224*   (2006.01)
(52) U.S. Cl. ........................ 464/145; 464/906
(58) Field of Classification Search .................. 464/145, 464/146, 173, 175, 903, 906; 180/905, 908, 180/906
See application file for complete search history.

(56) References Cited

U.S. PATENT DOCUMENTS

| | | | | |
|---|---|---|---|---|
| 4,494,941 | A | * | 1/1985 | Hirai et al. .................. 464/145 |
| 4,820,238 | A | * | 4/1989 | Uchida et al. ............... 464/906 |
| 6,319,133 | B1 | * | 11/2001 | Schwarzler et al. ......... 464/145 |
| 6,530,843 | B2 | * | 3/2003 | Miller et al. ................ 464/145 |

FOREIGN PATENT DOCUMENTS

| | | | |
|---|---|---|---|
| JP | 2000-136276 | | 5/2000 |
| JP | 2000-230570 | | 8/2000 |
| JP | 2001-097063 | | 4/2001 |
| JP | 2001-140849 | * | 5/2001 |
| JP | 2001-140849 A | * | 5/2001 |
| JP | 2001-343072 | | 12/2001 |
| JP | 2002-013544 | | 1/2002 |
| JP | 2002-039383 | | 2/2002 |
| JP | 2005-214395 A | * | 8/2005 |

OTHER PUBLICATIONS

GKN Catalog, GKN Automotive Inc., Auburn Hills, MI, 1993.*
Japanese Industrial Standard JIS K 6253, filed by the inventor's representative on Jul. 6, 2007.*
Webster's Dictionary definition of "chloroprene" [online] [retreived on Dec. 5, 2007]. Retrieved from the Internet:URL:http://lionrefernce.chadwyck.com.*

* cited by examiner

*Primary Examiner*—Greg Binda
(74) *Attorney, Agent, or Firm*—Arent Fox LLP

(57) ABSTRACT

In a drive shaft installed in a mounted type vehicle to traverse uneven terrains and adapted to transmit drive power to wheels through constant velocity joints $J_1$ and $J_2$ on the inboard and outboard sides, rubber boots are used as constant velocity joint boots.

6 Claims, 5 Drawing Sheets

DRIVE SHAFT FOR ATVS

BACKGROUND OF THE INVENTION

1. Field of the Invention

This invention relates to a drive shaft for ATVs (All Terrain Vehicle: a mounted type vehicle designed to traverse uneven terrains, also called a four-wheeled buggy).

2. Brief Description of the Prior Art

An ATV, which is a mounted type of four-wheeled or three-wheeled vehicle designed to traverse uneven terrains, is equipped with balloon tires to freely traverse such uneven terrains as wasteland and sandy place. The power transmission device for ATVs, as conceptually shown in FIG. 4, is constructed such that, for example, the power from an engine 21 is outputted from the output shafts on the front and rear sides via a speed change mechanism in the interior and is inputted to differential gears 24 and 25 on the front and rear sides via power transmission means 22 and 23, such as chains or propeller shafts. And, the engine power inputted to the differential gears 24 and 25 is reduced in speed by the mechanism of the differential gears 24 and 25 and is converted to a rotational power in a direction orthogonal thereto, whereupon it is transmitted to the front wheels 28 and rear wheels 29 through drive shafts 26 and 27. In the example shown in the same figure, constant velocity joints are used for joints A between the drive shaft 26 on the front side and the differential gear 24 and for joints B in the front wheels 28. In addition, there are cases where constant velocity joints are used for joints C between the drive shaft 27 on the rear side and the differential gear 25 and for joints D in the rear wheels 29. Further, when propeller shafts are used as the power transmission means 22 and 23, there are cases where constant velocity joints are used for joints E and F between the propeller shafts and the output shafts of the engine (speed change mechanism) 21 and joints G and H in the differential gears 24 and 25.

FIG. 5 shows the drive shaft 26 on the front side. In order to allow the drive shaft 26 to make angular displacement and axial displacement following the movement of the front wheel 28 during cornering, traversing uneven terrains or the like movement, a slide type constant velocity joint 30 and a fixed type constant velocity joint 31 are used in pair for joining the drive shaft 26. Here, the fixed type constant velocity joint means a constant velocity joint that allows only an angular displacement between two shafts, while the slide type constant velocity joint means a constant velocity joint that allows not only an angular displacement between two shafts but also an axial displacement (plunging). In the example shown in the same figure, the inboard side of the drive shaft 26 is joined to the differential gear 24 (at the joining section A) through the slide type constant velocity joint (double offset type constant velocity joint, hereinafter referred to as "DOJ") 30, while the outboard side of the drive shaft 26 is joined to the wheel 28 (at the joining section B) through a fixed type constant velocity joint (Rzeppa type constant velocity joint: ball fixed joint, hereinafter referred to as "BJ") 31. The numerals 32 and 33 denote boots for the constant velocity joints.

Heretofore, as the DOJ and BJ, those for passenger cars have been frequently converted to be used as such. Refer to FIGS. 6 and 7 of Japanese Patent Application Laid Open under No. 2001-97063.

Since vehicle weight restrictions are severe particularly for ATVs, further weight reduction or size compaction has been required of the drive shafts thereof. Further, since ATVs are small in size, narrow in width and high in vehicle height, the normal working angle of the constant velocity joints installed in the drive shaft is nearly twice that of those for passenger cars. For this reason, for passenger car specifications, the working stability of the constant velocity joints would be impaired depending on usage conditions or the like. Further, about half of the durability (life) of constant velocity joints for passenger cars or the like is sufficient for constant velocity joints for ATV as considered from balance between market performance and the term of guarantee; therefore, considered on the basis of passenger car specifications as they are, there is a feeling of excessive quality consciousness. As to the frequency of use, about half for passenger car specifications is sufficient as considered from balance with vehicle speed, and the same may be said. On the other hand, in the aspect of strength, such as twist strength, the same degree as for passenger car specifications is required.

In this connection, drive shaft for passenger cars employ Hytrel or other resin boots for constant velocity joint boots 33 on the outboard side where they are frequently subjected to flying sands or disturbances. However, the resin boot, which is high in rigidity, performs the function of increasing the resistance to the bending of the constant velocity joint. Particularly, concerning the drive shaft on the front side for driving the front wheels, i.e., the steering wheel which takes steer angles through steering links, the resistance to the bending of the constant velocity joint due to the hardness of the resin boots gives a large influence to the steering feeling. The influence on the steering feeling due to the hardness of such resin boots could be ignored in the case of passenger cars in which power steering is employed. However, in the case of steering mechanism for ATVs, since the handle bar is mechanically joined to the steering links, the bending resistance of the drive shaft on the front side directly influences the steering feeling.

SUMMARY OF THE INVENTION

A main object of this invention is to improve the steering feeling for ATVs.

In order to achieve the object, the invention provides a drive shaft which is installed in a mounted type vehicle designed to traverse uneven terrains, and which transmits drive power to the wheels through constant velocity joints on the inboard and outboard sides, wherein the boot for at least one of the constant velocity joints is made of a boot material whose hardness, in terms of JISK6253 Durometer Hardness A Type, is 65 or less at normal temperature (25° C.) and is 77 or less at low temperature (−20° C.). Specifically, the boot material corresponds to such boot material as CR (chloroprene rubber) or neoprene rubber (NR). Employing such boot material leads to reduced bending resistance of the constant velocity joint, contributing much to improvement in the steering feeling.

The boots of the constant velocity joints on the outboard side may advantageously be of rubber in respect of improving the steering feeling.

The constant velocity joint on the outboard side may comprise an outer ring having a plurality of axially extending track grooves disposed circumferentially of an inner spherical surface, an inner ring having a plurality of axially extending track grooves disposed circumferentially of an outer spherical surface, torque transmitting balls which engage the track grooves of the outer and inner rings, and a cage interposed between the inner spherical surface of the outer ring and the outer spherical surface of the inner ring and having pockets for receiving the torque transmitting balls, wherein the groove center of the track grooves of the outer ring and the groove center of the track grooves of the inner ring are axially offset by equal spacings in mutually opposite directions on opposite sides of the joint center, as viewed in a longitudinal joint section.

The opening-side end of the track grooves of the outer ring may be provided with a straight section, and the opposite opening-side end of the track grooves of the inner ring is provided with a straight section.

The relation between the axial dimension L of the pockets of the cage and the diameter d of the torque transmitting balls may be $-30\ \mu m \leq (L-d) \leq 0$. Whereas an excessive interference has conventionally been imparted, the interference is reduced, thereby allowing the torque transmitting balls to smoothly roll when the constant velocity joints are bent. Therefore, the resistance to the bending of the constant velocity joints is reduced, improving the steering feeling.

The center of curvature of the outer spherical surface of the cage and the center of curvature of the inner spherical surface of the cage may be axially offset. Here, there are two types of offset: an offset of center of curvature of the ball track of the inner and outer rings, i.e., a track offset, and an offset of the centers of curvature of the inner and outer spherical surfaces of the cage, i.e., a cage offset. Let the sum total of the two be called a total offset. If the total offset is set to be excessively small, this aggravates the workability of the joint. Application of the cage offset results in local material thickening in the axial direction, which leads to aggravation of window punching and directionality, so that assemblage is also aggravated. However, if the track offset alone is set to be large, the groove depth on the innermost side of the outer ring track becomes shallow, thus aggravating the ride-on durability. Accordingly, minimizing the track offset and making up for the shortage by cage offset makes it possible to secure workability and to maintain ride-on durability.

According to the invention, as compared with the steering feeling for a conventional drive shaft using a resin boot, the steering feeling for ATVs is remarkably improved.

Embodiments of the invention will now be described with reference to the drawings.

DESCRIPTION OF THE PREFERRED EMBODIMENTS

Figure 1:
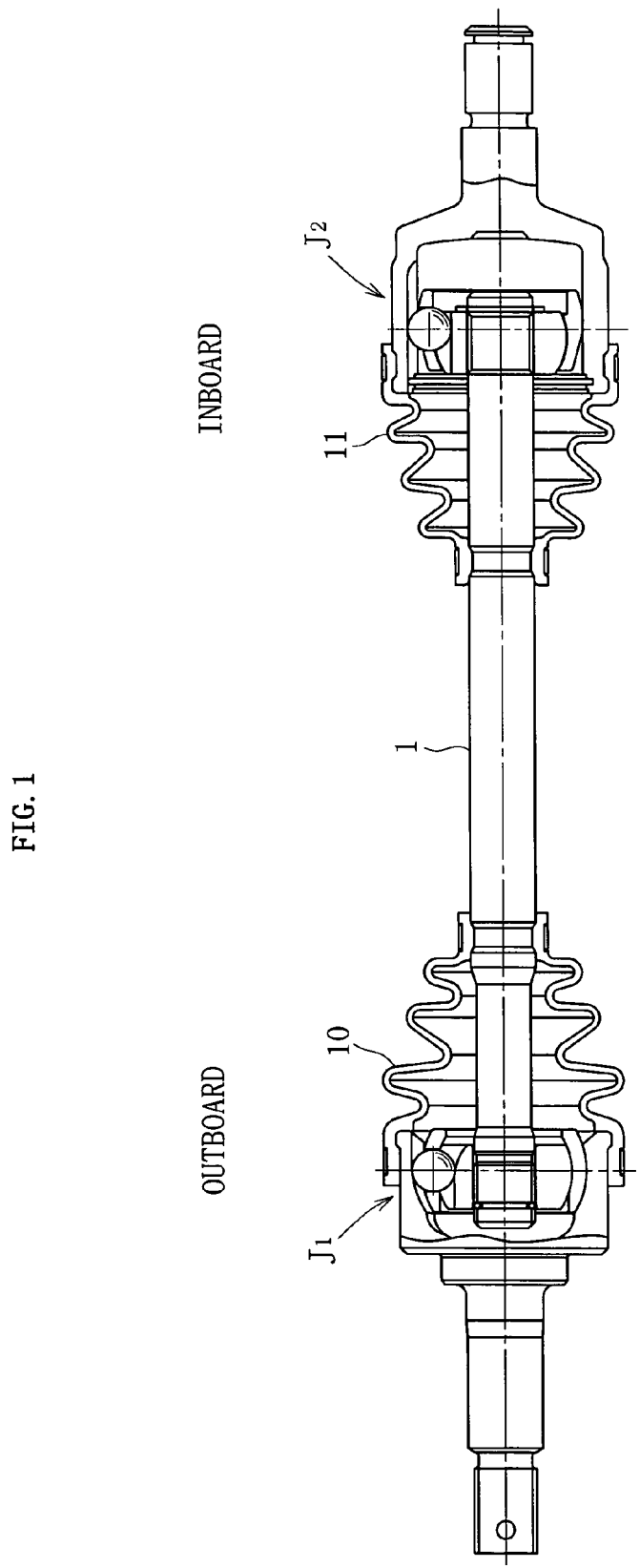
FIG. 1 is a longitudinal sectional view of drive shaft for ATVs, showing an embodiment of the invention.
Figure 4:
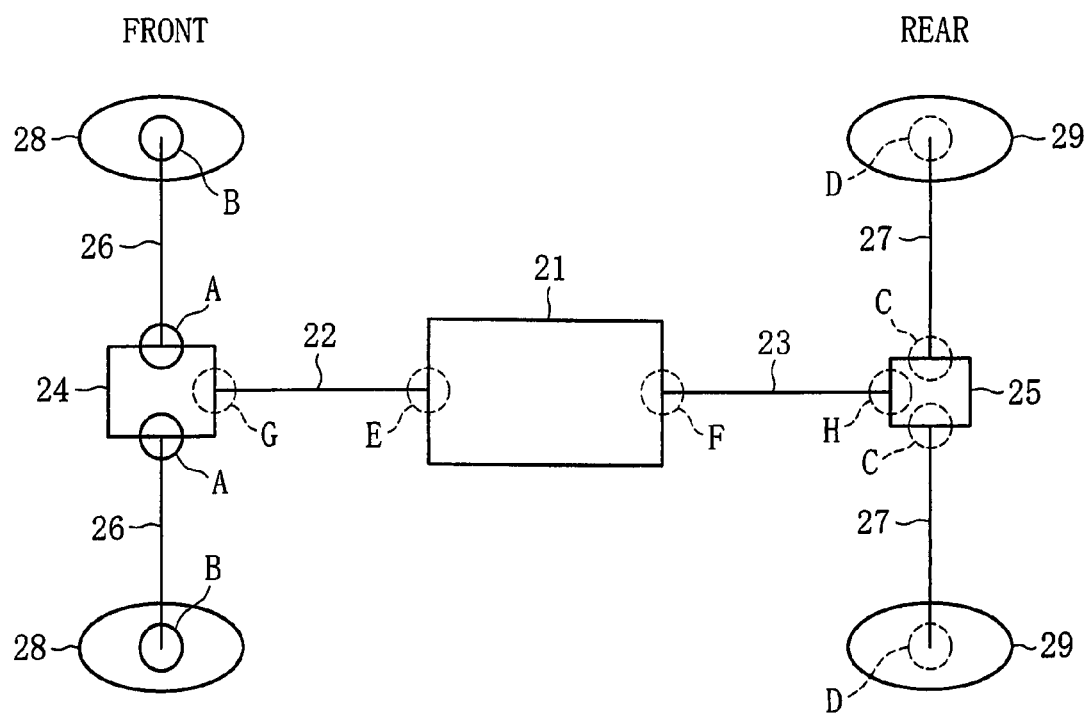
FIG. 4 is a conceptual view of a power train for ATVs.
Figure 5:
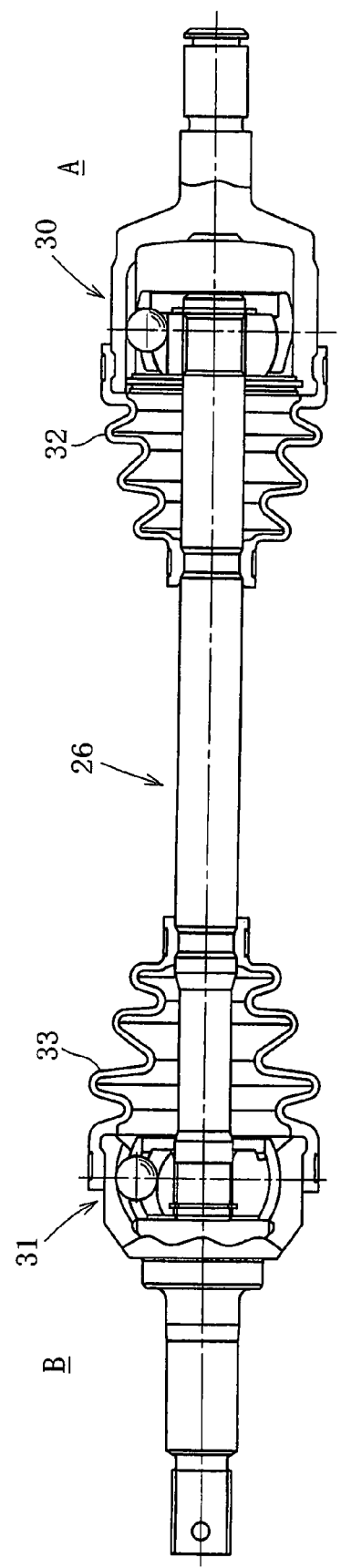
FIG. 5 is a longitudinal sectional view of conventional drive shaft for ATVs.

A drive shaft for ATVs, as shown in FIG. 1, comprises a constant velocity joint $J_1$ on the outboard side, a constant velocity joint $J_2$ on the inboard side, and an intermediate shaft 1 joining the two joints $J_1$ and $J_2$. The constant velocity joint $J_1$ on the outboard side is joined to a wheel, while the constant velocity joint $J_2$ on the inboard side is joined to a differential gear (see FIG. 4).

Figure 2:
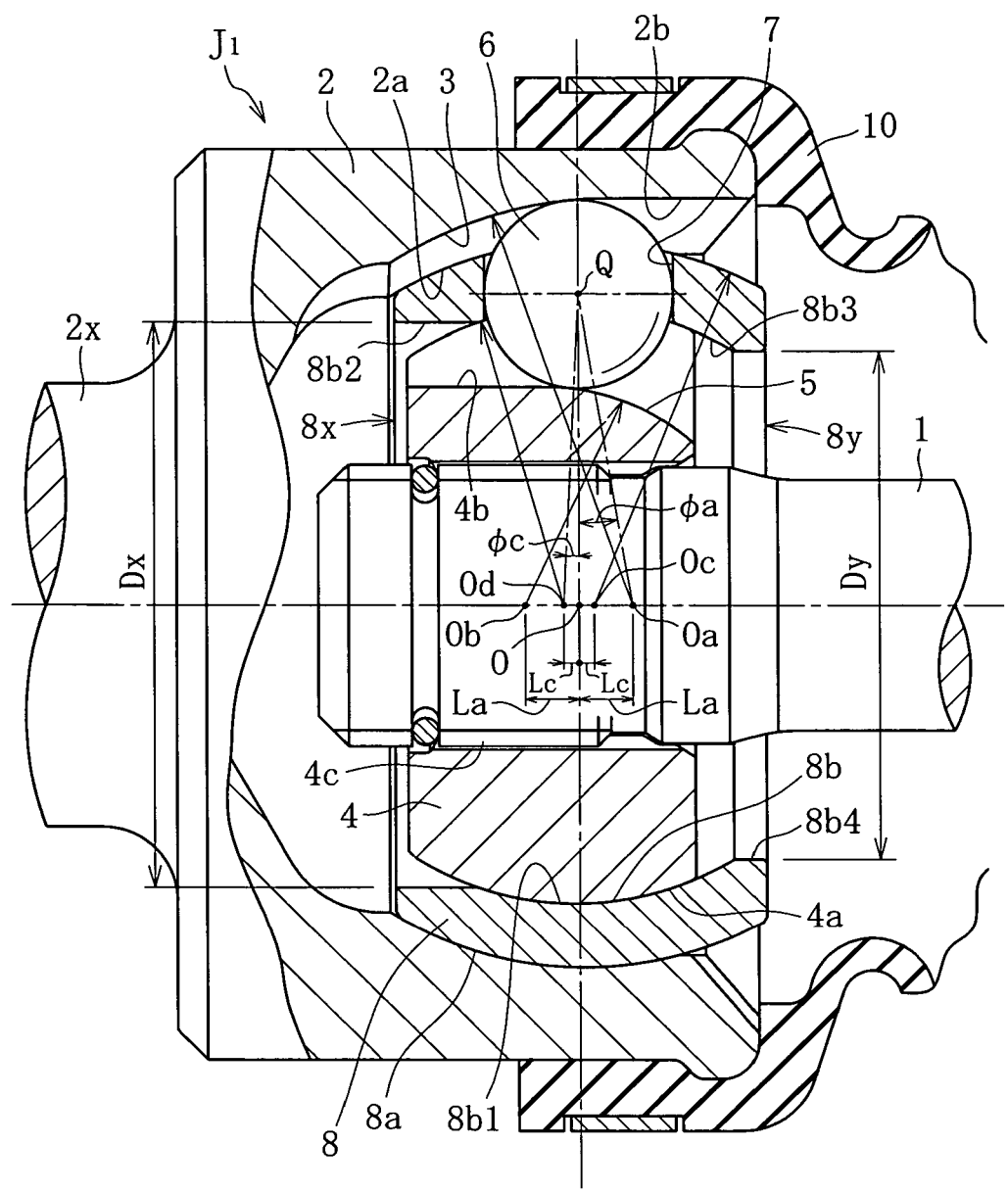
FIG. 2 is a longitudinal sectional view of an UJ in the drive shaft of FIG. 1.

The constant velocity joint $J_1$ on the outboard side is constituted by an undercut free type constant velocity joint (UJ). FIG. 2 illustrates a state assumed when the working angle θ of the undercut free type constant velocity joint is 0°. This constant velocity joint $J_1$ comprises an outer joint member 2 (outer ring) with a spherical inner peripheral surface 2a axially formed with a plurality (six or eight) of bottom-curved track grooves 3, an inner joint member 4 (inner ring) with a spherical outer peripheral surface 4a formed with a plurality (six or eight) of bottom-curved axial track grooves 5, a plurality (six or eight) torque transmitting balls 6 disposed in ball track formed by the opposed track grooves 3 and 5 of both joint members 2 and 4, and a cage 8 interposed between both joint members 2 and 4 and receiving and holding the torque transmitting balls 6 in a plurality of window-shaped pockets 7. And, the intermediate shaft 1 of the drive shaft (see FIG. 1) is joined to the inner joint member 4 through serrations 4c (or splines) formed in the inner periphery thereof, while a wheel-side member is joined to the stem 2x of the outer joint member 2.

As shown in FIG. 2, the ball track formed from the track groove 3 of the outer joint member 2 and the track groove 5 of the inner joint member 4 exhibits a shape (a wedge shape) which is wide in the inboard side (the right side in the same figure), gradually diminishing toward the outboard side (the left side in the same figure). In this case, the inboard-side region of the track groove 3 of the outer joint member 2, and the outboard-side region of the track groove 5 of the inner joint member 4 are formed with straight sections 2b and 4b, respectively, whose groove bottoms are linear as seen in a longitudinal section. The presence of the straight sections 2b and 4b results in the maximum working angle being set at 50°, which is greater than the conventional passenger car BJ maximum working angle (46.5°).

The center Od of the inner peripheral spherical surface 8b of the cage 8 is offset by a distance Lc taken axially from the joint center O to the outboard side. A cage offset angle φ c consisting of ∠OdQO defined by the center Od of the inner peripheral spherical surface 8b, the center Q of the torque transmitting ball 6, and the joint center O, that is, the offset angle of the inner spherical surface 8b of the cage 8 is set greater than 0° but less than 1° (preferably, 0.5°-0.8°, and in this embodiment, 0.7°). Further, the center Oc of the outer peripheral spherical surface 8a of the cage 8 is offset by the same distance Lc as above taken axially from the joint center O to the inboard side. A cage offset angle consisting of ∠OcQO defined by the center Oc of the outer peripheral spherical surface 8a, the center Q of the torque transmitting ball 6, and the joint center O is set greater than 0° but less than 1° (preferably, 0.5°-0.8°, and in this embodiment, 0.7°), in the same manner as above. In addition, the diameter of the spherical inner peripheral surface 2a of the outer joint member 2 and the diameter of the inner peripheral spherical surface 8b of the cage 8 are smaller at the opposite ends than at the axial center, though not shown, while the diameter of the outer peripheral spherical surface 8a of the cage 8 and the diameter of the spherical outer peripheral surface 4a of the inner joint member 4 are larger at the opposite ends than at the axial center. Thereby, the inner peripheral surface 2a of the outer joint member 2 and the outer spherical surface 8a of the cage 8 contact only at the axial opposite ends, and the inner spherical surface 8b of the cage 8 and the outer peripheral surface 4a of the inner joint member 4 also contact only at the axial opposite ends.

On the other hand, the center Oa of the track grooves 3 of the outer joint member 2 is offset by a distance La taken axially from the joint center O to the inboard side. From a total offset angle φa consisting of ∠OaQO defined by the center Oa of the track grooves 3 of the outer joint member 2, the center Q of the torque transmitting ball 6, and the joint center O is found the offset angle of the track of the outer joint member 3, which is φa-φc. This offset angle of the track grooves 3 of the outer joint member 3 is set at 4°-6° (in this embodiment, 5°).

Further, the center Ob of the track grooves 5 of the inner joint member 4 is offset by the same distance La as above taken axially from the joint center O to the outboard side, and the track offset angle of the inner joint member 4 found from a total offset angle consisting of ∠ObQO defined by the center Ob of the track grooves 5 of the inner joint member 4, the center Q of the torque transmitting ball 6, and the joint center O is also set at 4°-6° (in this embodiment, 5°), in the same manner as above.

The diameter Dx of the opening 8x in the end of the cage 8 on the outboard side is set larger than the diameter Dy of the opening 8y in the end on the inboard side, the arrangement being such that the inner joint member 4 can be removably inserted in the cage 8 through the opening 8x on the outboard side. In this case, the diameter Dy of the opening 8y on the inboard side is set small with such a value that the inner joint member 4 cannot be removably inserted in the cage 8.

More specifically, whereas the outer peripheral surface 8a of the cage 8 is spherical substantially over the entire region (the region excluding the chamfered portions of the axial opposite ends), the inner peripheral surface 8b thereof is a spherical surface 8b1 in the axial central region (the region equal to or slightly larger than the axial width of the pocket 7), and the surface continuous with this spherical surface 8b1 is a cylindrical surface 8b2 on the outboard side and is a spherical surface 8b3 on the inboard side. In this case, the cylindrical surface 8b2 on the outboard side continuously extends to the end edge with substantially the same diameter, while the side which is further inboard of the spherical surface 8b3 on the inboard side is continuously formed with a cylindrical surface 8b4 which is smaller in diameter and in axial width than the cylindrical surface 8b2 on the outboard side.

Therefore, the thickness of the cage 8 gradually decreases as the cage extends from the axial central region to the outboard side, but gradually increases due to the cage offset as it extends for a predetermined distance from the axial central region to the inboard side. In other words, the average thickness of the inboard-side region, rather than the axial central region of the cage 8, is set such that it is greater than the average thickness of the outboard-side region. Further, the area of contact between the inner peripheral surface 8b of the cage 8 and the outer peripheral surface 4a of the inner joint member 4 is set such that it is narrower on the outboard side than on the inboard side. Along with this, the area of contact between the axial opposite sides of the pocket 7 in the inner peripheral surface 8b of the cage 8 and the outer peripheral surface 4a of the inner joint member 4 is set such that it is very narrow on the outboard side but becomes wider than that on the inboard side.

Further, the inboard-side end of the cage 8 projects from the inboard-side end of the outer joint member 2, whereby the axial width of the cage 8 is relatively long-sized. Further, the plurality of pockets 7 formed at equal intervals peripherally of the cage 8 are set the same in size (the same in axial width and peripheral length).

In this case, the value obtained by subtracting the diameter d1 of the torque transmitting ball 6 from the axial width L of the pocket 7 of the cage 8 (before the torque transmitting balls 6 are fitted), that is, the axial pocket clearance δ between the pocket 7 of the cage 8 and the torque transmitting ball 6 is set such that $-30\ \mu m \leq \delta \leq 0\ \mu m$. More preferably, this axial pocket clearance δ is set such that $-20\ \mu m \leq \delta \leq 0\ \mu m$. In addition, the torque transmitting balls 6 are fitted in the pockets 7 of the case 8 in such a manner as to be peripherally slightly movable.

The constant velocity joint $J_2$ on the inboard side is constituted by a double offset type constant velocity joint (DOJ).

Figure 3:
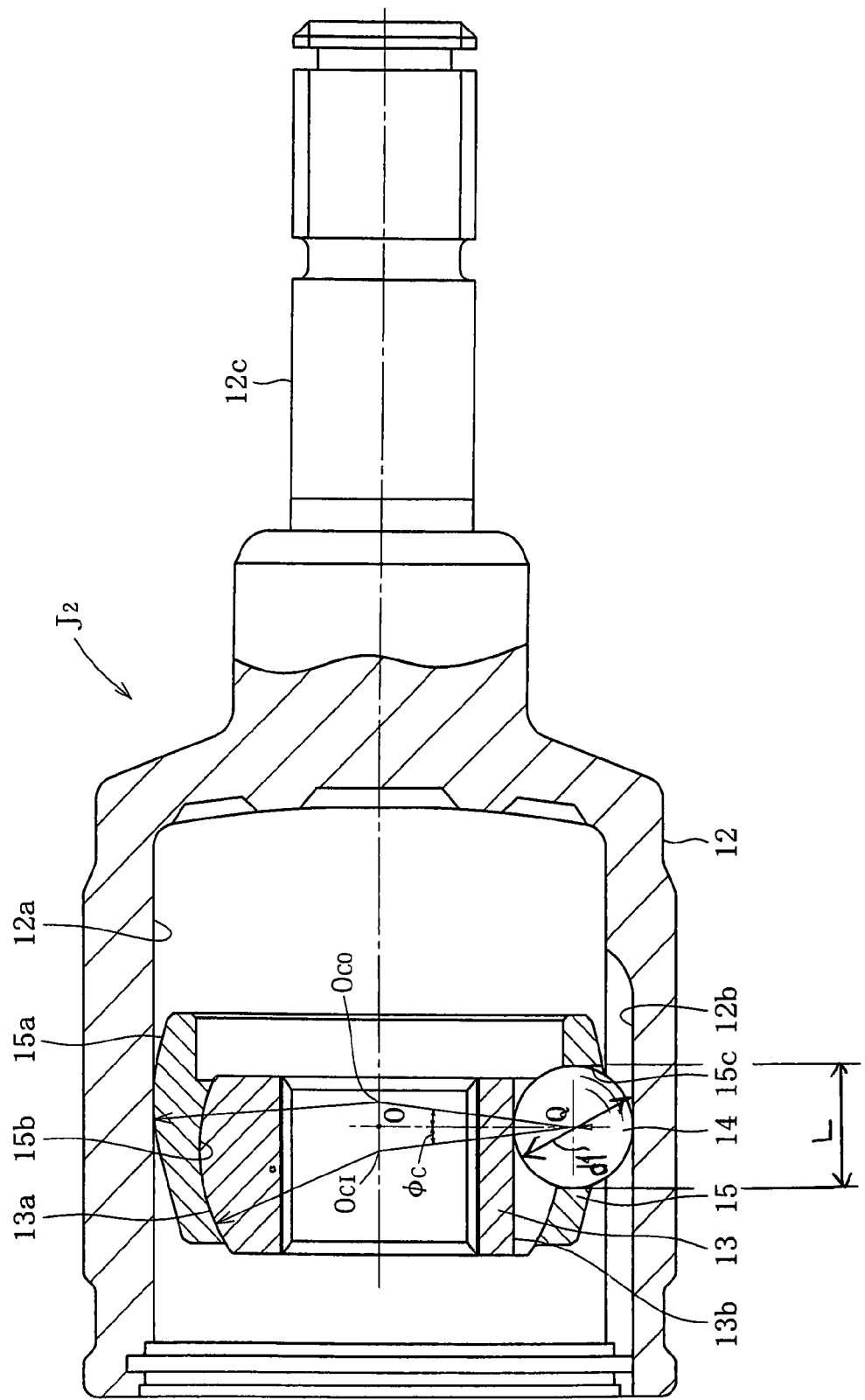
FIG. 3 is a longitudinal sectional view of a DOJ in the drive shaft of FIG. 1.

The DOJ, as shown in FIG. 3, comprises an outer ring (outer member) 12 whose cylindrical inner peripheral surface 12a is axially formed with a plurality (for example, 6) of linear track grooves 12b, an inner ring (inner member) 13 whose spherical outer peripheral surface 13a is axially formed with a plurality (for example, 6) of linear track grooves 13b, a plurality (for example, 6) of torque transmitting balls 14 disposed in a ball track defined by cooperation between the track grooves 12b of the outer ring 12 and the track grooves 13b of the inner ring 13, and a cage 15 for receiving the torque transmitting balls 14. The stem 12c of the outer ring 12 is joined to a differential gear, and the intermediate shaft 1 is joined to the inner periphery of the inner ring 13 through serrations or the like.

The cage 15 is an annulus comprising an outer spherical surface 15a contractually guided by the inner peripheral surface 12a of the outer ring 12, an inner spherical surface 15b contractually guided by the outer peripheral surface 13a of the inner ring 13, and a plurality (for example, 6) of pockets 15c for receiving the torque transmitting balls 14. The spherical center Oco of the outer spherical surface 15a and the spherical center $O_{CI}$ of the inner spherical surface 15b are axially offset by equal spacings in mutually opposite directions with respect to the joint center O.

When this joint is transmitting torque while assuming working angle, the cage 15 rotates to the position of the torque transmitting balls 14 which move on the ball track according to the inclination of the inner ring 13, the cage 15 holding the torque transmitting balls 14 in a plane which bisects the working angle. Thereby, the constant velocity nature of the joint is secured. Further, when the outer and inner rings 12 and 13 axially relatively move, slippage occurs between the outer spherical surface 15a of the cage 15 and the inner peripheral surface 12a of the outer ring 12, enabling smooth axial movement (plunging).

The allowable maximum working angle of the DOJ disposed on the inboard side is smaller than that of the constant velocity joint (UJ) on the outboard side, being set, for example, at 30.5°.

In the DOJ, the cage offset angle φc (∠OcoQO or $\angle O_{CI}QO$) defined by the spherical center Oco of the cage outer spherical surface 15a, the ball center Q, and the joint center O is set such that $7° \leq \phi c < 9°$. In conventional passenger car specifications DOJs, this cage offset angle φc has been set at 9° or above. However, herein it is set at smaller values than before for light weight and size compaction. Even if the cage offset angle φc is reduced in this manner, the track groove depths of the inner and outer rings can be made shallow, provided that the durability is set at about 70% of that for passenger car specifications. Thereby, the thickness of the cage 15 can be made large, thus making it possible to reliably prevent the balls 14 from jumping out of the cage pockets 15c when the allowable maximum working angle is taken.

The drive shaft described so far can be used not only on the front side but also on the rear side of ATVs.

In addition, the outboard-side constant velocity joint $J_1$ and inboard-side constant velocity joint $J_2$ are generally provided with boots 10 and 11, as shown in FIG. 1, in order to prevent leakage of the internally filled grease and entry of foreign matter from outside. However, concerning the front-side drive shaft, in relation to steering performance, particularly as the boot 10 for the constant velocity joint $J_1$ on the outboard side, use is made of a boot made of a boot material whose hardness, in terms of JISK6253 Durometer Hardness A Type, is 65 or less at normal temperature (25° C.) and is 77 or less at low temperature (−20° C.). Specifically, the boot material corresponds to such boot material as CR (chloroprene rubber)

or neoprene rubber (NR). Employing such relatively soft boot material leads to reduced bending resistance of the constant velocity joint, improving the steering feeling.

What is claimed is:

1. A drive shaft for All-Terrain Vehicles (ATVs) which is installed in a mounted type vehicle designed to traverse uneven terrains and which transmits drive power to front wheels through a constant velocity joint on an inboard side and a constant velocity joint on an outboard side, wherein a boot for at least the outboard side constant velocity joint is made of chloroprene rubber whose hardness, in terms of JISK6253 Durometer Hardness A Type, is 65 or less at normal temperature (25° C.) and is 77 or less at low temperature (−20° C.), and wherein the constant velocity joint on the outboard side comprises:

an outer ring having a plurality of axially extending track grooves disposed circumferentially of an inner spherical surface, an inner ring having a plurality of axially extending track grooves disposed circumferentially of an outer spherical surface, torque transmitting balls which engage the track grooves of the outer and inner rings, and a cage interposed between the inner spherical surface of the outer ring and the outer spherical surface of the inner ring and having pockets for receiving the torque transmitting balls, wherein a groove center of the track grooves of the outer ring and a groove center of the track grooves of the inner ring are axially offset by equal spacings in mutually opposite directions on opposite sides of a joint center, as viewed in a longitudinal joint section, wherein a track groove offset angle between 4° and 6° is defined between the groove center of either the track groove of the outer ring or the track groove of the inner ring, a center of the torque transmitting ball, and the joint center, and wherein an opening-side end of the track grooves of the outer ring is provided with a straight section, and an opposite opening-side end of the track grooves of the inner ring is provided with a straight section.

2. A drive shaft for ATVs as set forth in claim 1, wherein the relation between the axial dimension L of the pockets of the cage and the diameter d of the torque transmitting balls is −30 μm≦(L−d)≦0.

3. A drive shaft for ATVs as set forth in claim 2, wherein a center of curvature of an outer spherical surface of the cage and a center of curvature of an inner spherical surface of the cage are axially offset by equal spacings in mutually opposite directions on opposite sides of the joint center.

4. A drive shaft for ATVs as set forth in claim 3, wherein an offset angle φ c of the offset as measured from the center of curvature of the inner spherical surface of the cage to the center of the torque transmitting ball and to the joint center is in the range 0°<φc<1°.

5. A drive shaft for ATVs as set forth in claim 1, wherein a center of curvature of an outer spherical surface of the cage and a center of curvature of an inner spherical surface of the cage are axially offset by equal spacings in mutually opposite directions on opposite sides of the joint center.

6. A drive shaft for ATVs as set forth in claim 5, wherein an offset angle φ c of the offset as measured from the center of curvature of the inner spherical surface of the cage to the center of the torque transmitting ball and to the joint center is in the range 0°<φc<1°.

* * * * *